United States Patent
Murphy et al.

(10) Patent No.: US 11,726,835 B2
(45) Date of Patent: Aug. 15, 2023

(54) SYSTEMS AND METHODS FOR PCI LOAD BALANCING

(71) Applicant: Apple Inc., Cupertino, CA (US)

(72) Inventors: Michael W. Murphy, Menlo Park, CA (US); Gopal Thirumalai Narayanan, Santa Clara, CA (US); Deepak K. Mishra, Irvine, CA (US); Andre M. Glover, San Jose, CA (US); Sreenivas Tallam, San Jose, CA (US); Hardik K. Doshi, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 284 days.

(21) Appl. No.: 16/872,685

(22) Filed: May 12, 2020

(65) Prior Publication Data
US 2020/0356417 A1    Nov. 12, 2020

Related U.S. Application Data

(60) Provisional application No. 62/846,734, filed on May 12, 2019.

(51) Int. Cl.
*G06F 9/50* (2006.01)
*G06F 13/42* (2006.01)
(Continued)

(52) U.S. Cl.
CPC ............ *G06F 9/5083* (2013.01); *G06F 9/505* (2013.01); *G06F 13/4022* (2013.01); *G06F 13/4027* (2013.01); *G06F 13/4221* (2013.01); *G06F 13/4282* (2013.01); *H04L 47/125* (2013.01); *G06F 2213/0024* (2013.01); *G06F 2213/0026* (2013.01)

(58) Field of Classification Search
CPC .... G06F 9/505; G06F 9/5083; G06F 13/4022; G06F 13/4027; G06F 13/4221; G06F 13/4282; G06F 2213/0024; G06F 2213/0026; H05L 47/125
See application file for complete search history.

(56) References Cited

U.S. PATENT DOCUMENTS 5,742,587 A * 4/1998 Zornig .................... H04L 47/13
370/252
7,345,671 B2 * 3/2008 Robbin ................. G06F 1/1662
345/173

(Continued)

OTHER PUBLICATIONS

"ExpressLane PEX 8649-AA 48-Lane, 12-Port PCI Express Gen 2 Multi-Root Switch Data Book". Version 1.5. PLX Technology, Inc. Jan. 2013. (Year: 2013).*

*Primary Examiner* — Thomas J. Cleary
(74) *Attorney, Agent, or Firm* — Womble Bond Dickinson (US) LLP

(57) ABSTRACT

A method and apparatus of a device that load balances a first plurality of Peripheral Connect Interconnect ports is described. In an exemplary embodiment, the device detects a second plurality of PCI ports in the device. In addition, the device determines a load for each port in the first and second plurality of PCI ports and sorts the second plurality of PCI ports. The device further load balances the first plurality of PCI ports using at least a PCIe switch and the load determination of the second plurality of PCI ports. The device additionally communicates data between the first and second plurality of PCI ports.

20 Claims, 12 Drawing Sheets

(51) Int. Cl.
 *G06F 13/40* (2006.01)
 *H04L 47/125* (2022.01)

(56) References Cited

U.S. PATENT DOCUMENTS

| | | | | |
|---|---|---|---|---|
| 2004/0224638 | A1* | 11/2004 | Fadell | G06F 17/00 |
| | | | | 455/66.1 |
| 2011/0040916 | A1* | 2/2011 | Atherton | G06F 13/4295 |
| | | | | 710/300 |
| 2011/0080855 | A1* | 4/2011 | Fung | H04L 45/48 |
| | | | | 370/256 |
| 2012/0096192 | A1* | 4/2012 | Tanaka | G06F 13/385 |
| | | | | 710/20 |
| 2012/0265910 | A1* | 10/2012 | Galles | G06F 11/2005 |
| | | | | 710/300 |
| 2014/0059265 | A1* | 2/2014 | Iyer | G06F 9/46 |
| | | | | 710/313 |
| 2014/0189173 | A1* | 7/2014 | Folco | G06F 1/3287 |
| | | | | 710/106 |
| 2015/0295861 | A1* | 10/2015 | Dai | H04L 1/0001 |
| | | | | 370/218 |
| 2016/0231939 | A1* | 8/2016 | Cannata | G06F 3/0605 |
| 2017/0046295 | A1* | 2/2017 | Schwemmer | G06F 13/4022 |
| 2017/0052916 | A1* | 2/2017 | Kollu | G06F 13/4022 |
| 2018/0101500 | A1* | 4/2018 | Heyd | H04L 12/40032 |
| 2018/0198720 | A1* | 7/2018 | Yerushalmi | H04L 12/18 |
| 2018/0246833 | A1* | 8/2018 | Bai | G06F 13/4282 |
| 2018/0276173 | A1* | 9/2018 | Lockwood | G06F 13/4221 |
| 2018/0287820 | A1* | 10/2018 | Mayer-Wolf | H04L 45/7453 |
| 2019/0197000 | A1* | 6/2019 | Kurokawa | G06F 3/0607 |

\* cited by examiner

STATION E HAS 40 LANES OF LOAD, WHEREAS STATION F HAS 8 LANES OF LOAD

STARTIONS E AND F ARE BALANCED, STATIONS E AND F EACH HAVE 24 LANES OF LOAD

SYSTEMS AND METHODS FOR PCI LOAD BALANCING

This application claims the benefit of priority of U.S. Provisional Patent Application No. 62/846,734, filed on May 12, 2019, which is incorporated herein by reference in its entirety to provide continuity of disclosure.

FIELD OF INVENTION

This invention relates generally to peripheral component interconnect (PCI) and more particularly to balancing load across different PCI ports.

BACKGROUND OF THE INVENTION

Many computers or other devices couple internal and external components using a peripheral component interconnect (PCI) bus. PCI is a high-speed serial bus used to connect various different components with a host device. For example, the host device can be a computer with one or more PCI ports that are used to couple one or more components to that host device. The external PCI devices on slots can be a graphics card, storage, wireless networking component, wired networking component, bridge, expansion box, audio device, and/or any type of device component that communicates data with a central processing unit of the host device. In addition, the components can be internal to the host device or can be external to the host device. The external component can connect via an internal or external PCI bridge. The different PCI components that couple to the host device creates the host's PCI topology structure.

A problem can occur with this PCI topology in that one of the host's PCI ports can be coupled to a much greater load than another PCI port. For example, two PCI ports can be connected to two upstream switch bridges that are oversubscribed. Let's say each of these PCI ports is associated with 16 PCI lanes connected to a PCI express (PCIe) switch upstream port. Thus, a total 32 PCI lanes are coming into the switch. But the PCIe switch downstream bridges use 64 lanes in total. This results in a two times over-subscription in the worst case. In this oversubscribed PCI topology static configuration of load between the two switch upstream ports could lead to much greater load on one port than another port depending on which downstream links are active. A dynamic discovery and load balancing scheme is required to distribute the load fairly among the two switch upstream ports via switch reconfiguration.

SUMMARY OF THE DESCRIPTION

A method and apparatus of a device that load balances a first plurality of Peripheral Connect Interconnect ports is described. In an exemplary embodiment, the device detects a second plurality of PCI ports in the device. In addition, the device determines a load for each port in the first and second plurality of PCI ports and sorts the second plurality of PCI ports. The device further load balances the first plurality of PCI ports using at least a PCIe switch and the load determination of the second plurality of PCI ports. The device additionally communicates data between the first and second plurality of PCI ports.

In a further embodiment, the device distributes resources across a device. In this embodiment, the device determines a number of enumerated and unenumerated root bridges coupled to the device, wherein each of the root bridges is part of the host's PCI Express Root Complex. In addition, for each unenumerated root bridge, the device distributes spare resources among the unenumerated root bridges. Furthermore, for each of the enumerated root bridges, the device allocates spare resources among the unenumerated root bridges if the root bridge hosts a multiplexed controller and allocates spare resources uniformly across the root bridge if the root bridge does not host a multiplexed controller.

In another embodiment, the device determines a set of suggested changes to a first plurality of device to port assignments of a device. In this embodiment, the device receives the first plurality of device to port assignments of the device, where each of the first plurality of device to port assignments for the device is associated with a plurality of devices and a plurality of ports. In addition, the device determines a load of each device of the plurality of devices and each port in the plurality of ports. Furthermore, the device determines a second plurality of device to port assignments based on at least the load for the plurality of devices and the plurality of ports, where a measure of set of a load differences between device to port assignments in the second plurality of device to port assignments is smaller than a measure of set of load differences between device to port assignments in the second plurality of device to port assignments. The device additionally determines a set of changes for device to port assignments based on at least the first and second device to port assignments.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1A:
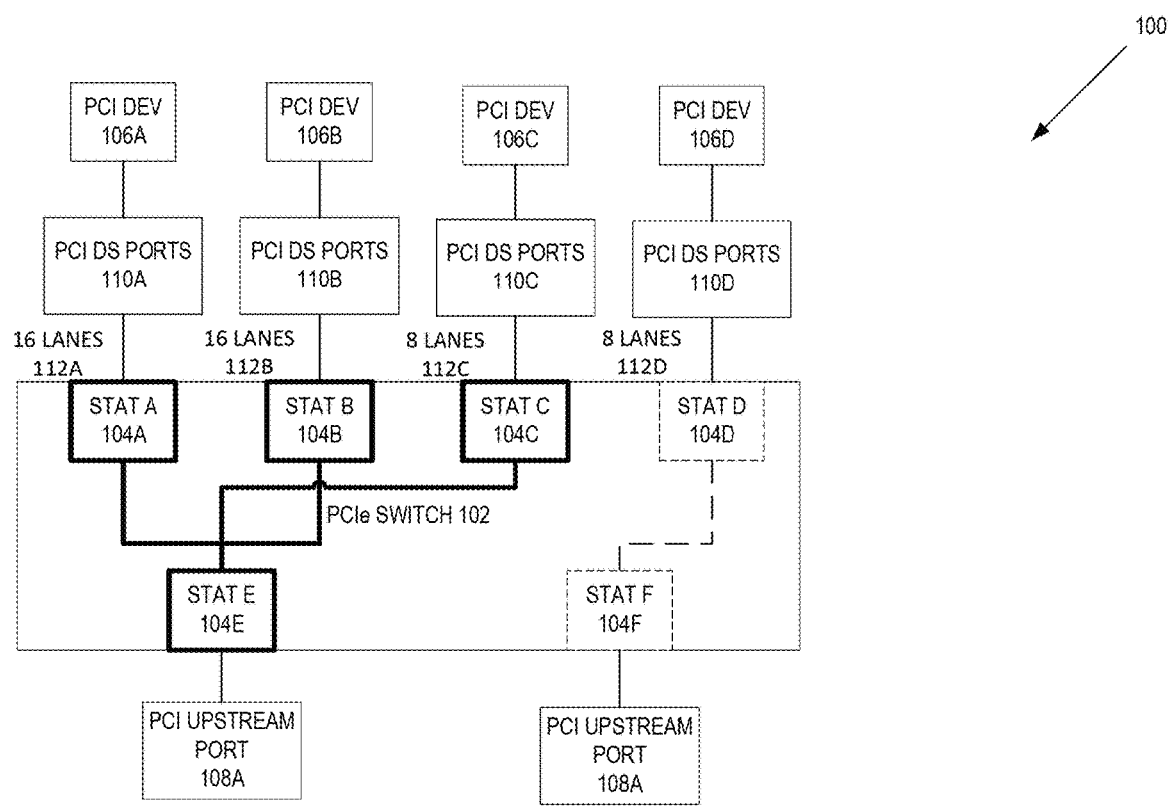
FIG. 1A is an illustration of one embodiment of an unbalanced Peripheral Component Interconnect (PCI) topology for connecting downstream PCI devices to upstream PCI ports.

A method and apparatus of a system that load balances a first plurality of Peripheral Connect Interconnect ports in the system is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a system that load balances a first plurality of Peripheral Connect Interconnect ports in the system is described. In a PCIe topology involving a PCIe switch with oversubscribed links where the PCIe switch itself is a multi-topology subsystem configurable via virtual switches, the oversubscription can be fairly distributed by dynamically calculating and balancing the PCIe throughput load across the links of the virtual switches. In one embodiment, a boot up of a system that includes a host device that has a number of PCI devices coupled to the host device and the PCI devices are assigned to different PCI ports (e.g. a root complex port). The PCI devices can be skewed to one or the other PCI ports. For example and in one embodiment, two root complex ports are connected to the two upstream PCI (switches that are over-subscribed. Each root complex port can be associated with 16 PCI lanes connected to a PCIe switch upstream port. Thus, a total 32 PCI lanes are coming into the switch. But the PCIe switch downstream bridges use 64 lanes in total. This results in a two times over-subscription in the worst case. Hence, a method is needed to dynamically figure out load across the two root complex ports and balance the load.

In another example, static (pre-discovery) PCIe switch configurations are not load balanced and load on a particular root complex port can be significantly more than another root complex port for a particular configuration if load balancing is not done. In this example, one root complex port may have 40 PCI lanes associated with this port and another root complex port has a much smaller assignment of 8 PCI lanes.

In one embodiment, the system can use a PCIe switch that is between upstream PCI ports and downstream PCI ports for the PCI devices coupled to the host device. The system further load balances the load from the downstream PCI devices with the upstream PCI ports of the host device using the PCIe switch that couples the downstream PCI devices and the upstream PCI ports of the host device. In one embodiment, the system calculates a load of the downstream PCI devices and creates a sorted relocatable port list from the calculated loads. The system further iterates through the sorted relocatable port list, balancing the upstream PCI ports at each iteration. In one embodiment, a balanced set of ports does not need to necessarily have an equal load on each of the balanced ports. In this embodiment, a balanced set of upstream PCI ports can have a load difference that is within one load of the PCI devices.

For example and in one embodiment, the two PCI ports could be load balanced for a set of PCI devices with loads 4, 4, 4, and 8 lanes if there is a load for one PCI port is 12 lanes and the load for another PCI port is 8 lanes. In this example, even though the loads between the two PCI ports are different, the difference between the loads of these two ports is within a load of one of the downstream PCI devices. In one embodiment, PCI can refer to any of a type of PCI technology (e.g., PCI Express (PCIe), PCI, PCI-X, and/or another type of high-speed serial bus connection).

In a further embodiment, the system performs a light enumeration or discovery. In this embodiment, during a system boot, enumeration of the PCI device coupled to the host device occurs in two stages, pre and post Discovery. Because a PCIe switch's setup during pre-discovery will be lost at post-discovery, a new PCIe switch setup is created. During the light enumeration or discovery, the system further enumerates the bridge in the PCI devices and allocates resources among those bridges.

In another embodiment, the system can scan the current PCI ports to PCI device assignments to determine if the PCI port to PCI device assignments can be adjusted so that a slot or card is not as underutilized. In this embodiment, the system determines which PCI slots or PCI cards are underutilized and creates sorted lists for the underutilized PCI slots and/or PCI cards. Using these lists, the system can create a set of suggested changes that can be used to optimize the PCI slot to PCI card configuration. In addition, the system can present these suggested changes to the user through a user interface.

FIG. 1 is an illustration of one embodiment of a PCI topology for connecting downstream PCI devices 106A-D to upstream PCI ports 108A-B. In FIG. 1, a PCIe switch topology 100 is illustrated, in which downstream devices 106A-D are coupled to upstream system ports 108A-B via a PCIe switch 102. In one embodiment, the PCIe switch topology 100 is part of a system that can include a host device (not illustrated) (e. g., a personal computer, a laptop, a server, and/or any other type of device that can couple to a PCI device) and one or more PCI devices that are coupled to the host device via a PCI port. In one embodiment, each PCI device 106A-D can represent one or more PCI devices, which can be a graphics card, storage, wireless networking component, wired networking component, bridge, expansion box, audio device, and/or any type of device component that communicates data with a central processing unit of the host device. In a further embodiment, each of the PCI devices 106A-D couples to the host device by one or more PCI lanes. In this embodiment, the number of lanes used by the PCI device can depend on the generation and/or functionality of the PCI device. For example and in one embodiment, a graphics processing card (GPU) can utilize 16 PCI lanes, whereas a different type of PCI device (e.g., hot plug bridge) can utilize fewer number of lanes.

In one embodiment, the system can have multiple PCI devices 106A-D that oversubscribes the PCI capabilities of the host device. In this embodiment, the PCI devices 106A-D coupled to the host device may formally utilize a greater number of PCI lanes than the host device has. Furthermore, the host device can have multiple root complex ports (e.g., PCI Upstream ports 108A-B) that are used to couple the multiple PCI devices 106A-D with the host device. In one embodiment, a problem can occur where one of the PCI ports can be oversubscribed with a large number of PCI lanes coupled to a first set of PCI devices and another one of the PCI ports is coupled to a second set of PCI devices and utilizing a smaller number of PCI lanes. In this embodiment, the load from the PCI devices coupled to the host device is unbalanced, as one of the PCI upstream ports has a much larger number of PCI lanes than the other PCI upstream port.

As illustrated in FIG. 1A, the PCI topology 100 of the system has a skewed load between the PCI upstream port 108A and the PCI upstream port 108B, where the PCI upstream port 108A is allocated with 40 PCI lanes (generation 3) versus eight PCI lanes (generation 3) for the PCI upstream port 108B. In this embodiment, the PCIe switch 102 and, in particular, PCI upstream port 108A are oversubscribed. In one embodiment, upstream PCI ports means PCI ports that are connected to the host device and downstream PCI ports or devices are PCI ports or devices that are connected or are the PCI devices.

In one embodiment, in between the downstream to PCI devices 106A-D and the upstream ports 108A-D is a PCIe switch 102 that includes four downstream PCI ports 104A-D (also referred to as stations 104A-D, which are coupled to the PCI downstream ports 110A-D of the respective PCI devices 106A-D, respectively) and two upstream PCI ports 104E-F (also referred to as stations 104A-D). In this embodiment, there 16 lanes 112A between PCI downstream device port 110A and port 104A, 16 lanes 112B between PCI downstream device port 110B and port 104B, 8 lanes 112C between PCI downstream device port 110C and port 104C, and 8 lanes 112D between PCI downstream device port 110D and port 104D. While in one embodiment, the PCIe switch 102 is this illustrated with four PCI downstream ports and two upstream PCI ports, in alternate embodiments, the PCIe switch 102 can include more or less downstream PCI and/or upstream PCI ports. In one embodiment, the PCIe switch 102 switches data from the downstream PCI devices 106A-D to the upstream PCI ports 108A-B by mapping the downstream switch ports 104A-D to the upstream switch ports 104E-F. In this embodiment, by making PCI lane assignments from the downstream switch ports 104A-D to the upstream switch ports 104E-F of the switch, the PCI data can be better load balanced, so that one of the upstream PCI ports is not unbalanced. In one embodiment, the system is load balanced for the PCI devices 106A-D by moving the load from one or more of these downstream switch ports 104A-D to one of the upstream switch ports 108A-B, such that the load between the remaining upstream switch ports 108A-B is relatively balanced. In one embodiment, a balanced set of ports does not need to necessarily have an equal load. In this embodiment, a balanced set of upstream switch ports 108A-B can have a load difference that is within one of the loads of a PCI device 106A-D downstream of the switch. In one embodiment, each of the available PCI upstream ports 108A-B ports are coupled to different upstream PCIe switch ports 104E-F. In this embodiment, by load balancing the upstream PCIe switch ports 104E-F, the PCI upstream ports 104E-F are load balanced.

Figure 1B:
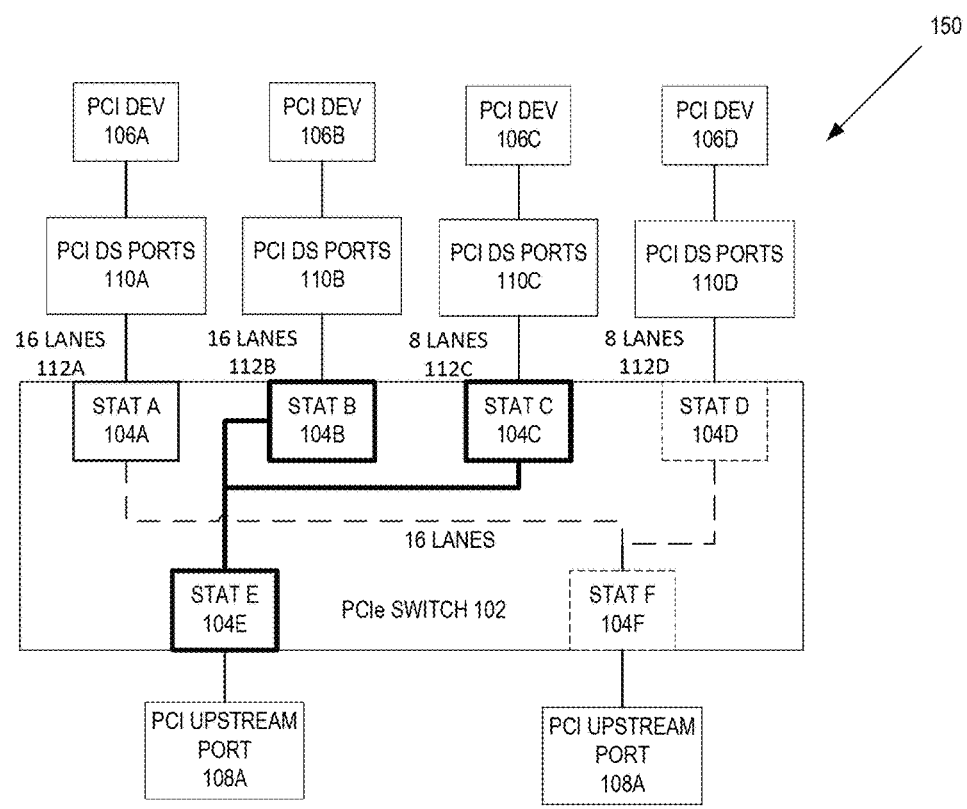
FIG. 1B is an illustration of one embodiment of a balanced PCI topology for connecting downstream PCI devices to upstream PCI ports.

In FIG. 1A, the PCI upstream ports 108A-B are unbalanced, because the PCI upstream port 108A has 40 lanes of load and the PCI upstream port 108B has 8 lanes of load. FIG. 1B is an illustration of one embodiment of a balanced PCI topology for connecting downstream PCI devices to upstream PCI ports. In FIG. 1B, the number of lanes to each of the PCI upstream ports 108A-B is balanced, where each of the PCI upstream ports 108A-B has 24 lanes of load. Even though each of the PCI upstream ports 108A-B is oversubscribed, the PCI upstream ports 108A-B are balanced. While in one embodiment, the PCI upstream ports 108A-B have the same number of lanes of load, in alternate embodiments, the PCI upstream ports 108A-B can have differing amount of load, but a load that is closer to being even than in the unbalance situation. For example and in one embodiment, the PCI upstream port 108A and PCI upstream port 108B could be load balanced for a set of PCI devices with loads 4, 4, 4, 8 lanes if there is a load for the PCI upstream port 108A is 12 lanes and the load for the PCI upstream port 108B is 8 lanes. In this example, even though the loads between the PCI upstream ports 108A-B are different, the difference between the loads of these two ports is within a load of one of the downstream devices. In one embodiment, once the PCI upstream ports are load balanced, the system generates a bitmap vector configuration for the PCIe switch 102 that maps the lanes from the downstream switch ports 104A-D to the upstream ports 104E-F. In this embodiment, the system uses this bitmap vector configuration configures the switch, such that the load for the PCI upstream ports 108A-B ports are relatively balanced.

Figure 2:
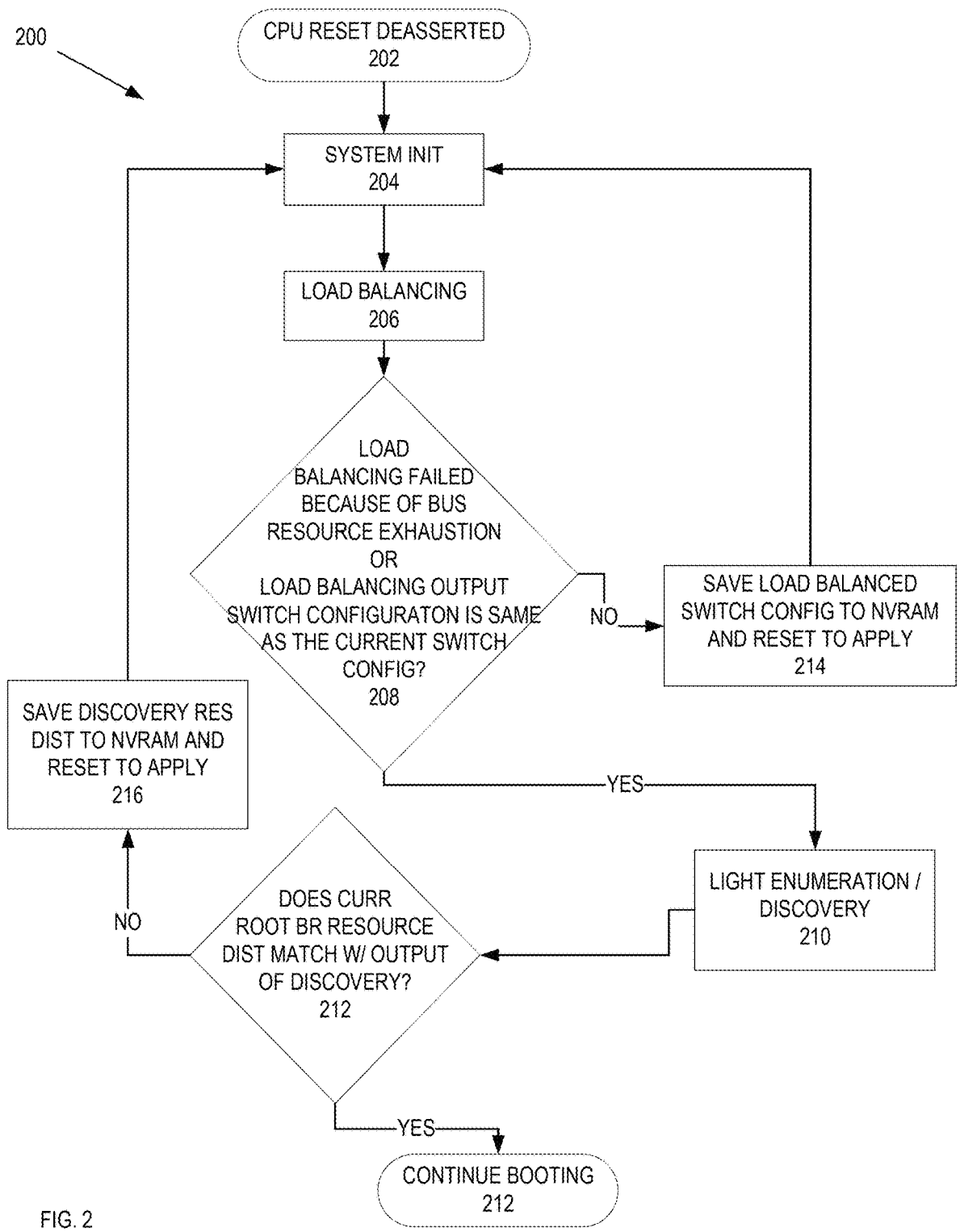
FIG. 2 is a flow diagram on one embodiment of a process to boot up a device that includes load balancing of PCI devices.

As described above, the load-balancing of the PCI ports can occur during the boot up of a host device that is coupled to one or more PCI devices. FIG. 2 is a flow diagram on one embodiment of a process 200 to boot up a device that includes load balancing of PCI devices. In FIG. 2, a CPU reset is de-asserted at block 202. At block 204, process 200 performs a system initialization. In one embodiment, the system initialization can include initializing clocks, performing memory calibration, and/or other steps used to initialize a system. Process 200 performs the PCI load-balancing at block 206. In one embodiment, process 200 performs the PCI load-balancing by identifying the load for each of the downstream switch ports, sorting the downstream switch ports based on the load, and making lane assignments such that the load between the remaining upstream PCI ports is relatively balanced. Performing the PCI load-balancing is further described in FIG. 3 below.

At block 208, process 200 determines if the load-balancing failed because of bus resource exhaustion or that the load-balancing output switch configuration is the same as the current configuration. If the answer is no to either of these questions, process 200 saves the load balanced switch configuration to NVRAM and performs a reset to apply the load balance switch configuration. However, if the answers to both of the questions at block 208 are each yes, process 200 performs a light enumeration or discovery at block 210. In one embodiment, process 200 performs a light enumeration or discovery because during system boot, the discovery initially performed is lost so that a new switch configuration needs to be created. Performing the light enumeration or discovery is further described in FIG. 6 below. At block 212, process 200 determines if the current root bridge resource distribution matches with the output of this discovery. If the resource distribution matches with the output of the discovery, process 200 continues to boot the system at block 212. If the current root bridge resource distribution does not match with the output of the discovery, execution proceeds to block 204 above.

Figure 3:
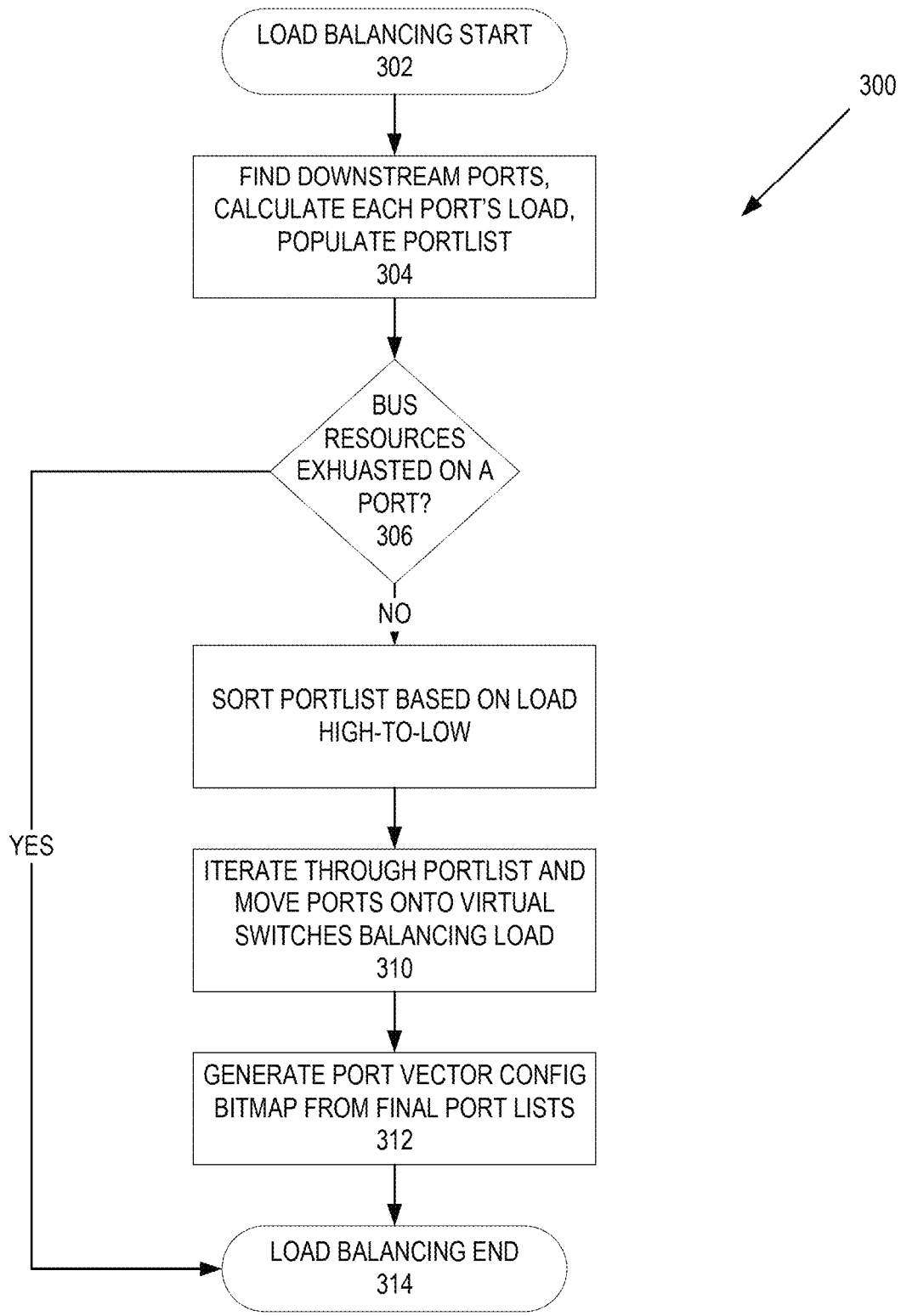
FIG. 3 is a flow diagram on one embodiment of a process to load balance a group of PCI devices coupled to a device.

As described above, process 200 performs a PCI device load-balancing during the booting of the system. In one embodiment, process 200 performs the load-balancing of the PCI devices so as to relatively balance the load on the upstream PCI ports. FIG. 3 is a flow diagram on one embodiment of a process to load balance a group of PCI devices coupled to a device. In FIG. 3, process 300 begins with the load-balancing start at block 302. At block 304, process 300 finds downstream ports, calculates each of the port's load, and populates the port list. In one embodiment, process 300 finds the ports by finding the downstream ports based on Vendor ID and device ID (as process 300 knows which ports in the topology are oversubscribed) as well as the Port Type in the PCI express capability that indicates a PCIe switch downstream port. In this embodiment, for each of the downstream ports found by process 300, process 300 calculates a figure of merit for each downstream PCI port, so as to determine the load on these ports. The figure of merit is a metric used by process 300 to determine a load for each of these downstream PCI ports. With the calculated load, process 300 can populate a port list, where each of the port list entries includes the load for that port. At block 306, process 300 determines if the bus resources are exhausted on a port. If not, process 300 sorts the port lists based on a high to low load (or a low to high load) at block 308. Finding the downstream PCI ports and calculating the load for each of these downstream PCI ports is further described in FIG. 4 below. Execution proceeds to block 310 below. If the bus resources are exhausted on a port execution proceeds to block 314, where the load-balancing ends.

At block 310, process 300 iterates through the sorted port list and moves ports onto virtual switches, balancing the load. In one embodiment, if a port list for one downstream switch port has PCI devices with loads 4, 8, 8, 8 lanes, and another downstream switch port has a PCI device with load of 16 lanes, process 300 could make assignment of one upstream PCI port having the PCI devices with loads of 4 and 16 lanes and the other PCI port having the assignments of PCI devices with loads 8, 8, and 8 lanes. Process 300 generates a port assignment definition from the final port lists at block 312. In one embodiment this port assignment definition is used to configure the PCIe switch, such that the port loads are relatively balanced on the upstream switch ports. Execution proceeds to block 314 where the load-balancing ends.

Figure 4:
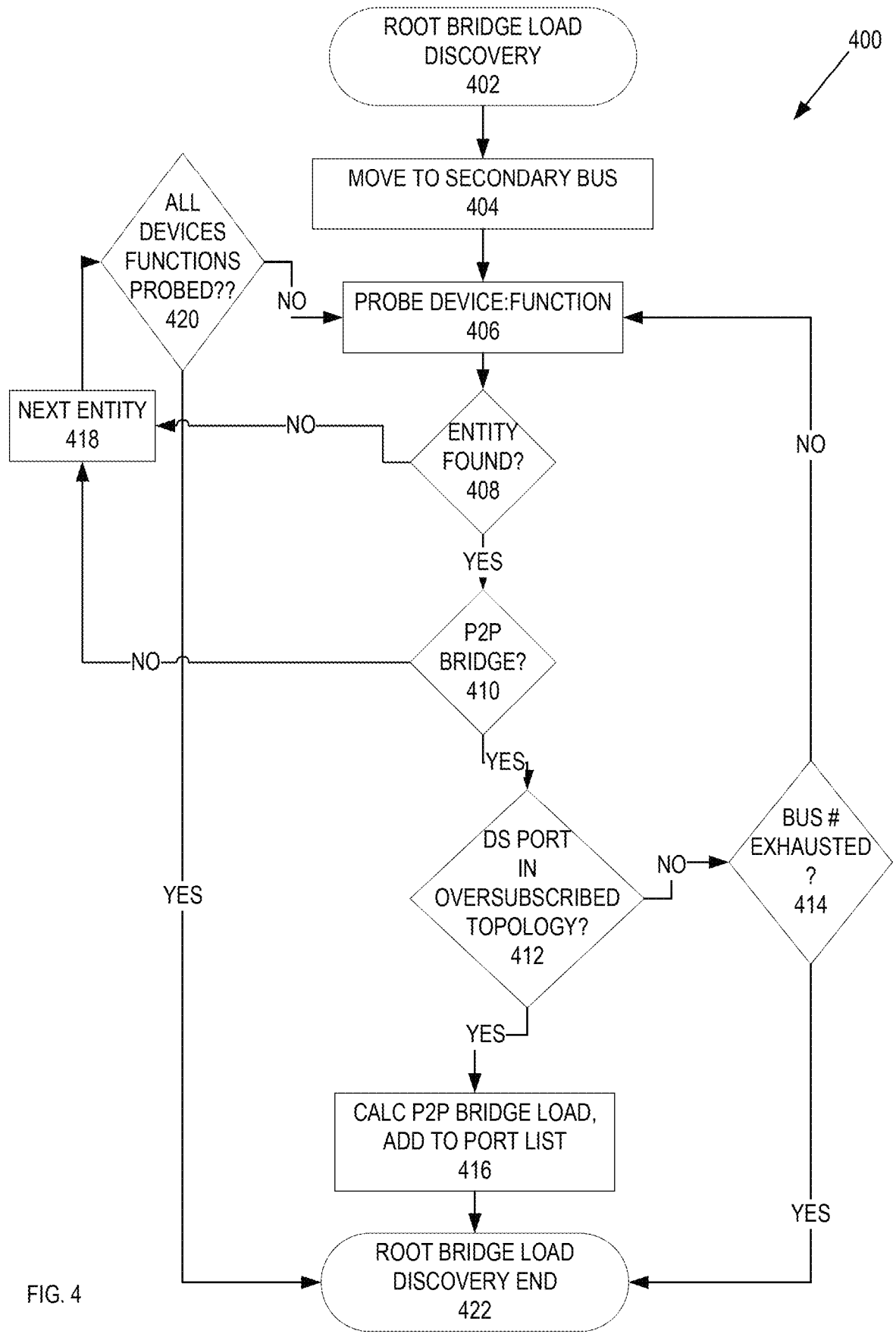
FIG. 4 is a flow diagram on one embodiment of a process to discover a load on the root bridges.

FIG. 4 is a flow diagram on one embodiment of a process 400 to discover a load on root bridges. In FIG. 4, the root bridge low discovery begins at block 402. At block 404, process 400 moves to the secondary bus. In one embodiment, a PCI bridge has a primary bus upstream of this bridge and a secondary bus downstream. Process 400 probes for the device function of the components attached to the secondary bus at block 406. At block 408, process 400 determines if a PCI entity is found. In one embodiment, a PCI entity has a unique combination of Bus, Device, and Function. If there is no PCI entity found, execution proceeds to block 418 below. If there is a PCI entity that is found, at block 410, process 400 determines if the PCI entity that is found is a PCI to PCI (P2P) bridge. If the PCI entity that is found is not a P2P bridge, execution proceeds to block 418 below. If the found PCI entity is identified as a P2P bridge, process 400 determines if this P2P bridge is a downstream port in an oversubscribed topology at block 412. If the P2P bridge is not a downstream port in an oversubscribed topology, process 400 determines if the bus numbers are exhausted at block 414. If the bus numbers are not exhaustive block 414, execution proceeds to block 406 above. If the bus numbers are exhausted at block 414, execution proceeds to block 422 below.

If the P2P bridge that is identified at block 410 is a downstream port in an oversubscribed topology, execution proceeds to block 416 below. At block 416, process 400 calculates the P2P bridge load and adds this P2P bridge to the port list. Calculating the P2P bridge load is further described in FIG. 5 below.

At block 418, process 400 proceeds to the next PCI entity. At block 420, process 400 determines if the all of the devices have been probed at block 420. If there is a device that has not been probed at block 420, execution proceeds the block 406 above. If all of the devices have been probed at block 420, execution proceeds to block 422, where the root bridge low discovery ends.

Figure 5:
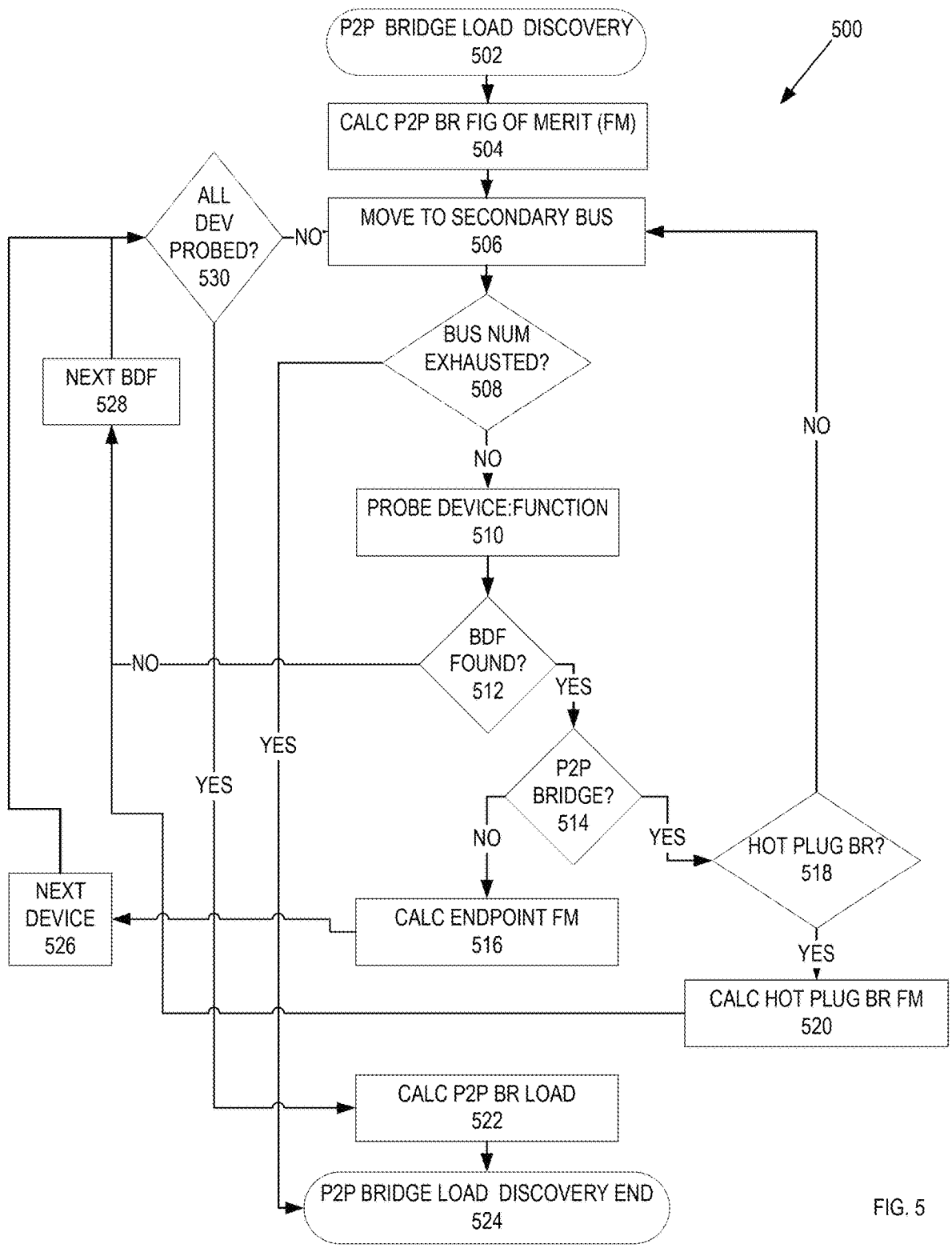
FIG. 5 is a flow diagram of one embodiment of a process to discover a load on PCI to PCI (P2P) bridges.

FIG. 5 is a flow diagram of one embodiment of a process 500 to discover a load on P2P bridges. In FIG. 5, the P2P bridge low discovery begins at block 502. At block 504, process 500 calculates the P2P bridge figure of merit. In one embodiment, figure of merit is a metric representing the amount of bandwidth a given device could consume. This metric is calculated by examining both the Link Capabilities and Link Status Registers of each partner on a link. When the Link Capabilities Register is examined the maximum link speed field is recorded. The negotiated link width field is recorded when the link status register is examined. In one embodiment, the figure of merit for each link Partner is calculated by the following equation:

$$a. \text{ Partner Figure of Merit} = \text{Link Width Field} * 2^{(\text{Max Link Speed Field}-1)} \tag{1}$$

As an example and embodiment, a device reporting a negotiated Link Width value of 0x2 (2 active Lanes) and a Max Link Speed value of 0x3 (Gen 3) would have a figure of merit of 8 (Merit=2*2^(3−1)). In one embodiment, a Partner is either PCI device on a PCI Link, where the PCI link is between two PCI ports.

In a further embodiment, a Link's Figure of Merit is:

$$a. \text{ Link Figure of Merit} = \text{Min}(\text{Link Partner } A, \text{Link Partner } B) \tag{2}$$

and a figure of merit for a PCI port is:

$$a. \text{ Root complex port Figure of Merit} = \Sigma \text{ Figure of Merit of all associated PCIe switch downstream links} \tag{3}$$

In one embodiment, load balancing two PCI ports is trying to satisfy this equation:

$$a. \text{ Root Complex Port Load Balancing: Root Complex Port } A \text{ Figure of Merit} \approx \text{Root Complete Port } B \text{ Figure of Merit} \tag{4}$$

The figure of merit can depend on the link capabilities and the link status registers of each of the devices on the link. Process 500 moves to the secondary bus at block 506. At block 508, process 500 determines if the bus resources are exhausted. If the bus numbers are exhausted, execution proceeds to block 524 below. If the bus numbers are not exhausted, process 500 probes the device function at block 510. At block 512, process 500 determines if a PCI entity is found. If a PCI entity is not found, execution proceeds to block 528 below. If a PCI entity is found, process 500 determines if the PCI entity is a P2P bridge at block 514. If the found PCI entity is a P2P bridge, execution proceeds to block 518 below. If the found PCI entity is not a P2P bridge, process 500 calculates the endpoint figure of merit. Execution proceeds to block 526, where process 500 moves to the next device.

At block 518, process 500 determines if the P2P bridge found at block 514 is a hot plug bridge. If this P2P bridge is a hot plug bridge, process 500 calculates the hot plug bridge figure of merit at block 520. Execution proceeds to block 528 below. If the P2P bridge is not a hot plug bridge, execution proceeds to block 506 above.

At block 528, process 500 moves to the next PCI entity. At block 530, process 500 determines all of the device functions have been probed. If all of the device functions have not probed, execution proceeds to block 506 above. If the all of the device functions have been probed, execution proceeds to block 522, where process 500 calculates the peer-to-peer bridge load. The P2P bridge load discovery ends at block 524.

In one embodiment, during the Discovery Phase, an audit of the system is made. This audit is used to determine the characteristics of the system's PCI topology. In this embodiment, two characteristics are gathered. The first characteristic is the total number of Bus Numbers needed by each discovered PCI Device contained within the enclosure. In one embodiment, each endpoint is identified and the number of Bus Numbers used to access the endpoints is recorded. In one embodiment, this accounting is applied to PCI devices inside the enclosure and does not extend belong the upstream PCI Port of each PCI hot plug bridge within the enclosure. Furthermore, during the post-discovery phase, the system will allot the required number of bus numbers to a given PCI Port to satisfy the needs of the devices coupled downstream of that port. In addition, the excess bus numbers are made available to the PCI Port connected to the system's PCI hot plug bridge.

In a further embodiment, the second audit characteristic is the figure of merit for each PCI Link Pair. The Figure of Merit is a metric representing the amount of bandwidth a given Device could consume as described above.

In one embodiment, the PCI Switch acts logically as two independent Switches. Each switch segment is composed of one upstream PCI port and one or more downstream PCI port(s). In this embodiment, the number of downstream PCI port attached to an upstream PCI Port is the result of the at least the link figure of merits, system considerations, and certain fixed assignments. The default fixed assignments are for the PCI ports connected to PCI hot plug bridges. The remaining Ports are available to be assigned to either switch segment.

Figure 6:
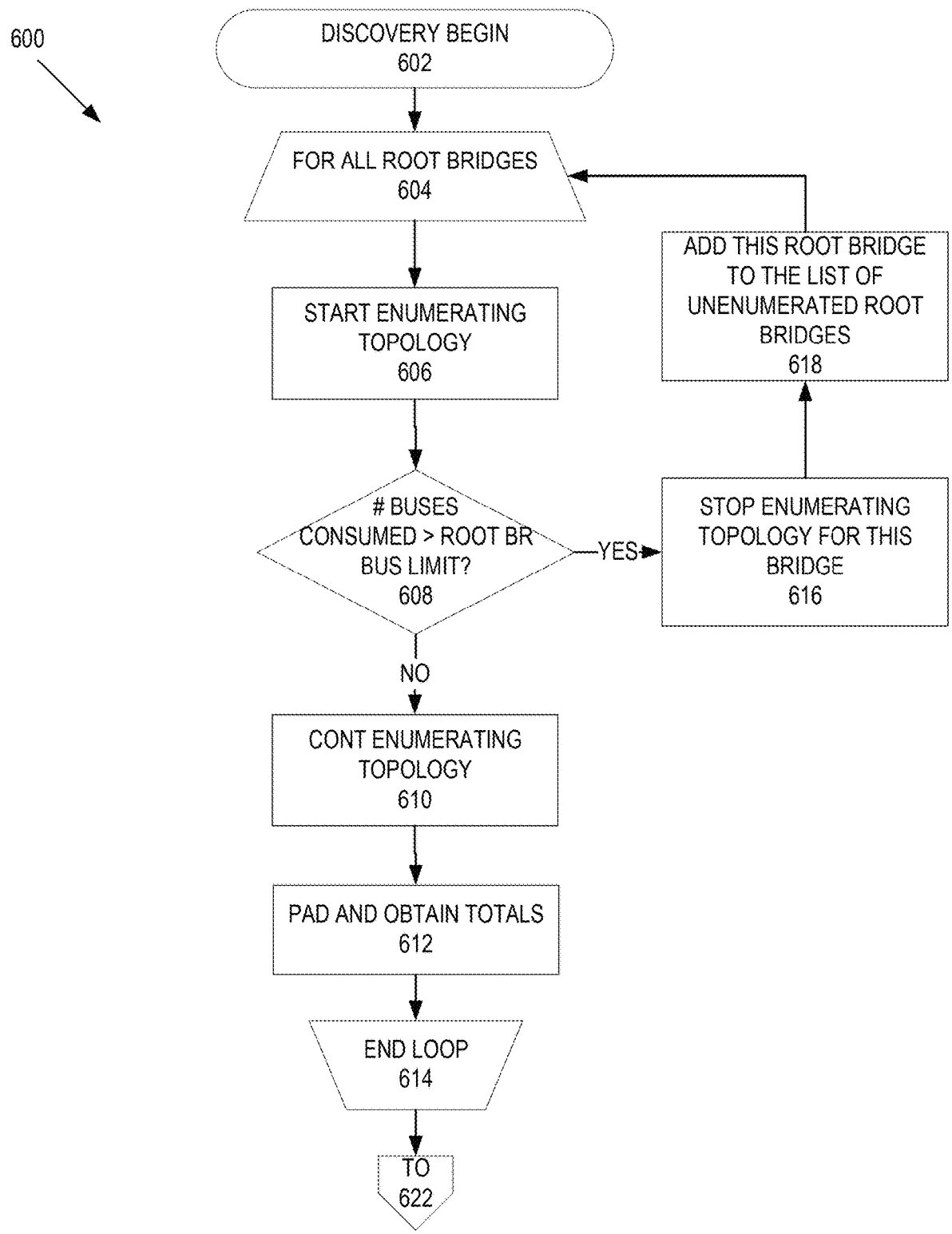
FIG. 6 is a flow diagram of one embodiment of a process to a light enumeration/discovery of the PCI device coupled to the device.
Figure 6:
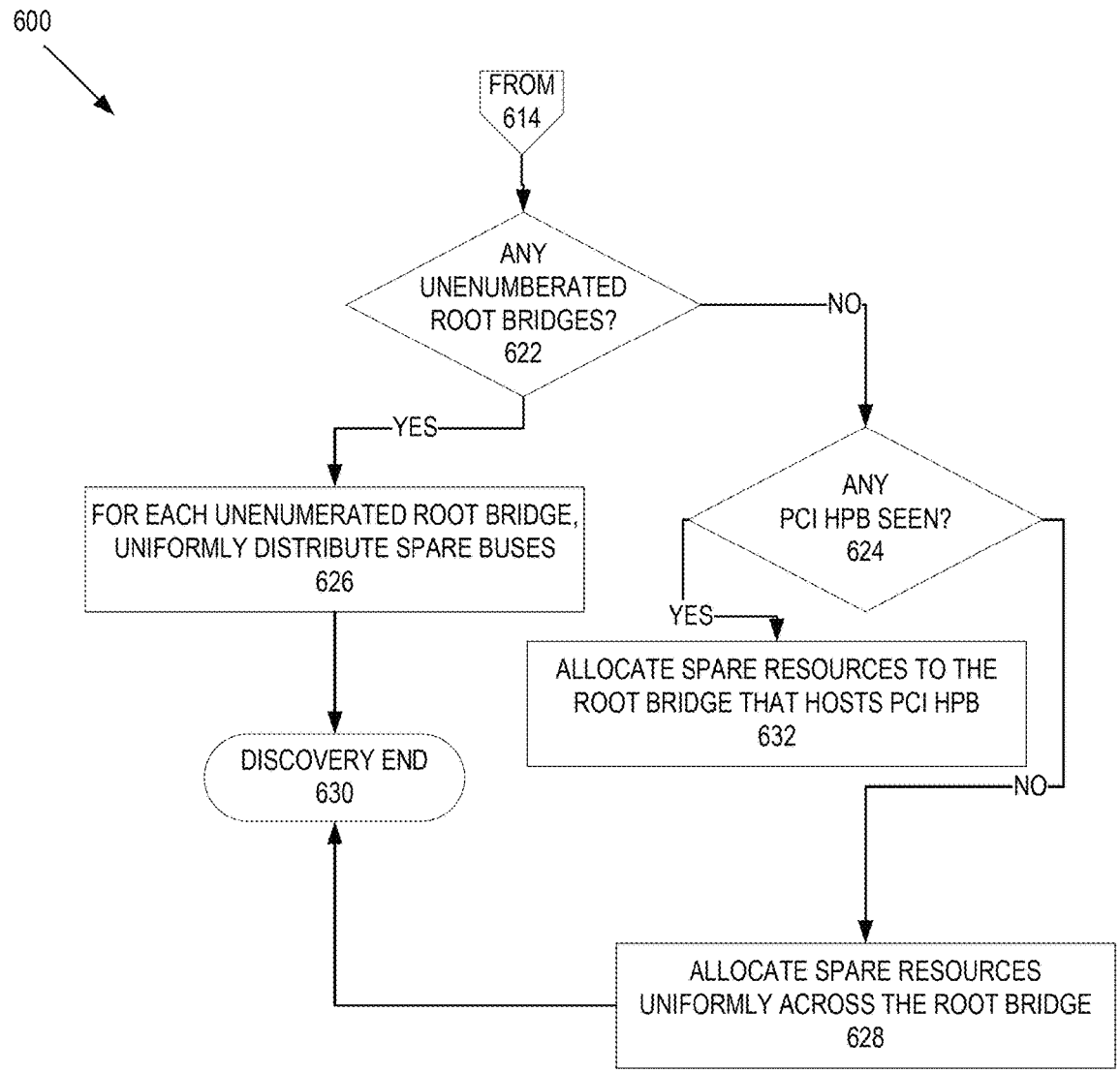

FIG. 6 is a flow diagram of one embodiment of a process 600 to perform a light enumeration or discovery of the PCI devices coupled to the system. While in one embodiment, the light enumeration/discovery is performed after a system initialization (e.g., in FIG. 2 at block 210), in alternate embodiments, the light enumeration/discovery can be performed each time a change in the PCI topology is detected by the host device. In FIG. 6, the discovery begins at block 602. Process 600 performs a processing loop (block 604-block 618) to determine the number of root bridges for the list of unenumerated bridges. At block 606 process 600 starts enumerating over the PCI topology. At block 608, process 600 determines of the number of buses chewed up is greater than the root bridge bus limit. If the number of buses consumed is greater than the root bridge bus limit execution proceeds at block 616 below. If the number of buses consumed is equal to or less than the root bridge bus limit, process 600 continues the enumeration of the bridges over the PCI topology at block 610. At block 612, process 600 pads and obtains the totals of the memory mapped input-output (IO), IO, and bus resources. The processing loop ends at block 614.

At block 616, process 600 stops enumerating over the PCI topology for this bridge. Process 600 further adds this root bridge to the list of unenumerated root bridges at block 618. Execution proceeds to block 604 above. At block 622, process 600 determines if there are any unenumerated root bridges. If there are no further unenumerated root bridges, execution proceeds at block 624 below. If there are unenumerated group bridges available, for each of the unenumerated group bridges process 600 uniformly distributes the spare busses at block 626. Execution proceeds to block 630 where the discovery ends.

At block 624, process 600 determines if any PCI hot plug bridges have been seen. If any PCI hot plug bridges have been seen, at block 632, process 600 allocates spare resources to the root bridge that hosts the PCI hot plug bridges. Execution proceeds to block 630 above. If no PCI hot plug bridges have been seen, at block 628, process 600 allocates spare resources uniformly across the root bridge. Execution proceeds to block 630 above.

As per above, part of the load-balancing process was calculating a figure of merit for the different PCI devices and/or the PCIe switch ports. The figure of merit is used as a metric to measure the load for one of these components. Because the system can measure the load using the figure of merit calculation, the system can use this figure of merit calculation to make suggested changes in the configuration of a PCI component to PCI port. In one embodiment, the system can scan the PCI ports and the PCI devices coupled to that port to determine if one or more of the PCI ports and/or PCI devices are being underutilized. Under the PCI standard, if there is an underutilized port and/or PCI device that port or PCI device will negotiate down to use the lowest common denominator of lanes for that pairing. Using this information, the system can make suggested changes to the user.

Figure 7:
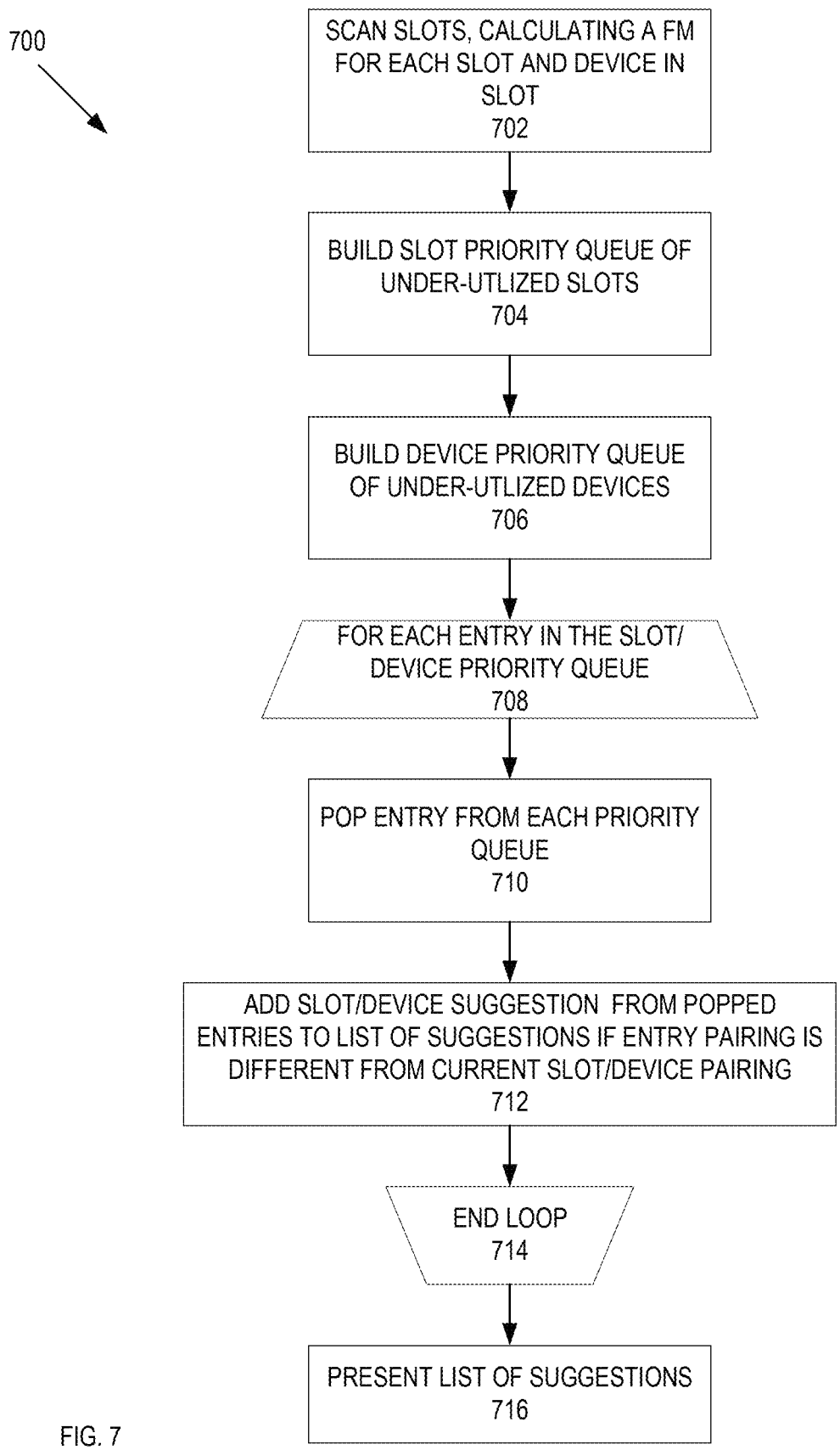
FIG. 7 is a flow diagram of one embodiment of a process to generate a list of suggested changes for a PCI configuration.

FIG. 7 is a flow diagram of one embodiment of a process to generate a list of suggested changes for a PCI configuration. In FIG. 7, process 700 begins by scanning the PCI slots of the system and calculating the figure of merit for each PCI slot and card in that slot at block 702. In one embodiment, a PCI slot is physical connector coupled to a PCI port. At block 704, process 700 builds a priority queue of underutilized PCI slots at block 704. In one embodiment, an underutilized slot is a PCI slot that can take a certain load that is greater than a load for a PCI card coupled to the PCI slot. For example and in one embodiment, a PCI slot with 16 lanes that is coupled to a PCI card that uses only four lanes leaves that PCI slot underutilized by 12 lanes. In addition, that PCI slot will negotiate with PCI card so that that PCI slot will communicate with that PCI card using the four PCI lanes. At block 706, process 700 builds a priority queue of underutilized PCI cards. Similar to above, an underutilized card is a PCI card that can take a certain load that is greater than a load for a PCI slot coupled to that PCI card. For example and in one embodiment, a PCI card with 16 lanes that is coupled to a PCI slot that can handle load of 8 lanes leaves the card underutilized by 8 lanes.

Process 700 executes a processing loop (blocks 708-714) to determine a list of suggested changes in the PCI slot card configuration. At block 710 process 700 pops an entry from each of the priority cues. Process 700 adds the slot/card suggestion from the popped entries to the list of suggestions if the entry pairing is different from the current slot card. For example and in one embodiment, if an 8-lane PCI card is in a 16-lane PCI slot and a 16-lane PCI card is in an 8-lane PCI slot, process 800 may make the suggestion to swap the cards The processing loop ends at block 714. Process 700 presents the list of suggestions in the user interface at block 716.

Figure 8:
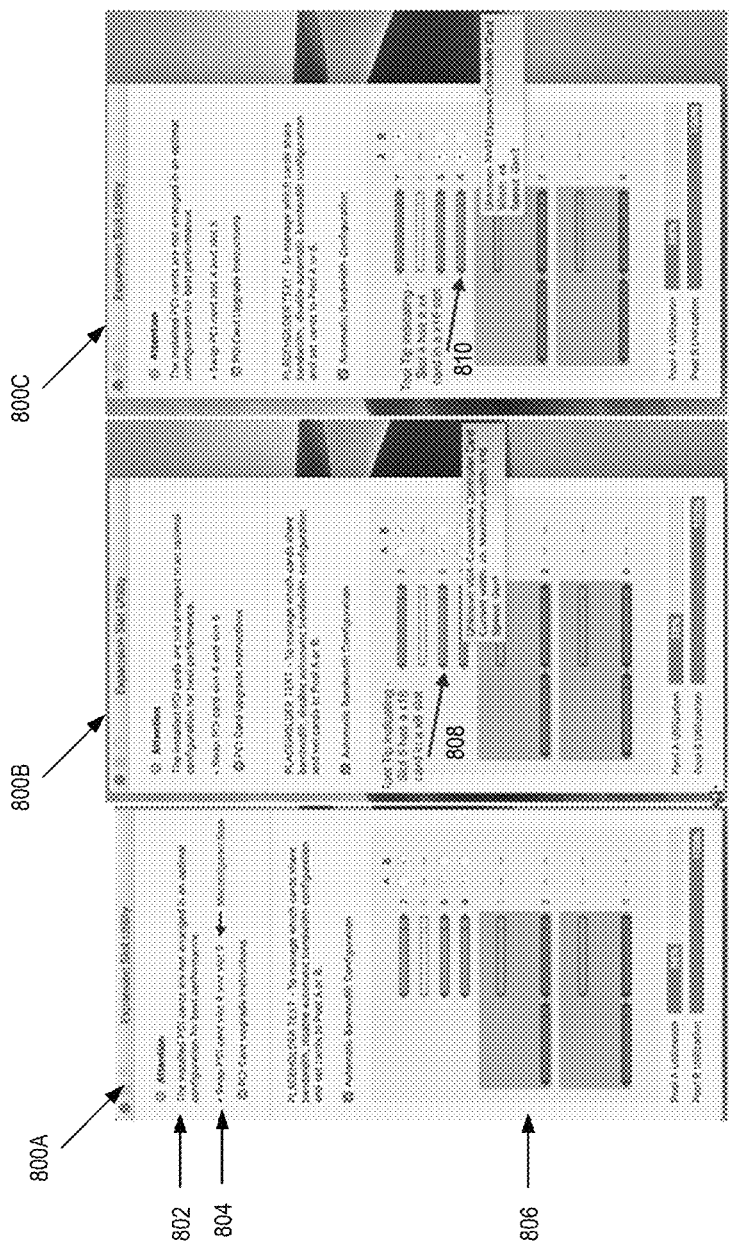
FIG. 8 is an illustration of user interface to present a list of suggested changes for a PCI configuration.

In FIG. 7 process 700 generated a list of suggested changes to the PCI slot/card configuration. In one embodiment, this information can be presented to a user through a user interface. FIG. 8 is an illustration of user interface to present a list of suggested changes for a PCI configuration. In FIG. 8, the user interface panels 800 A-C illustrate one embodiment of a user interface to present suggested changes to the PCI slot/card configuration. In one embodiment, user interface 800A includes text that suggests that the installed PCI cards were not arranged in an optimal configuration for best performance (802). In addition, user interface 800A includes a suggestion 804 that suggests the PCI cards in slots 4 and 5 can be swapped.

In the second user interface 800B, the tool tip can be used to display further information. In one embodiment, the tool tip displays information 808 that indicates that slot 5 has a 16-lane card in an 8-lane slot. As another example, as illustrated in user interface 800C, the tool tip displays information 810 that has a 4-lane card in a 16-lane slot.

Figure 9:
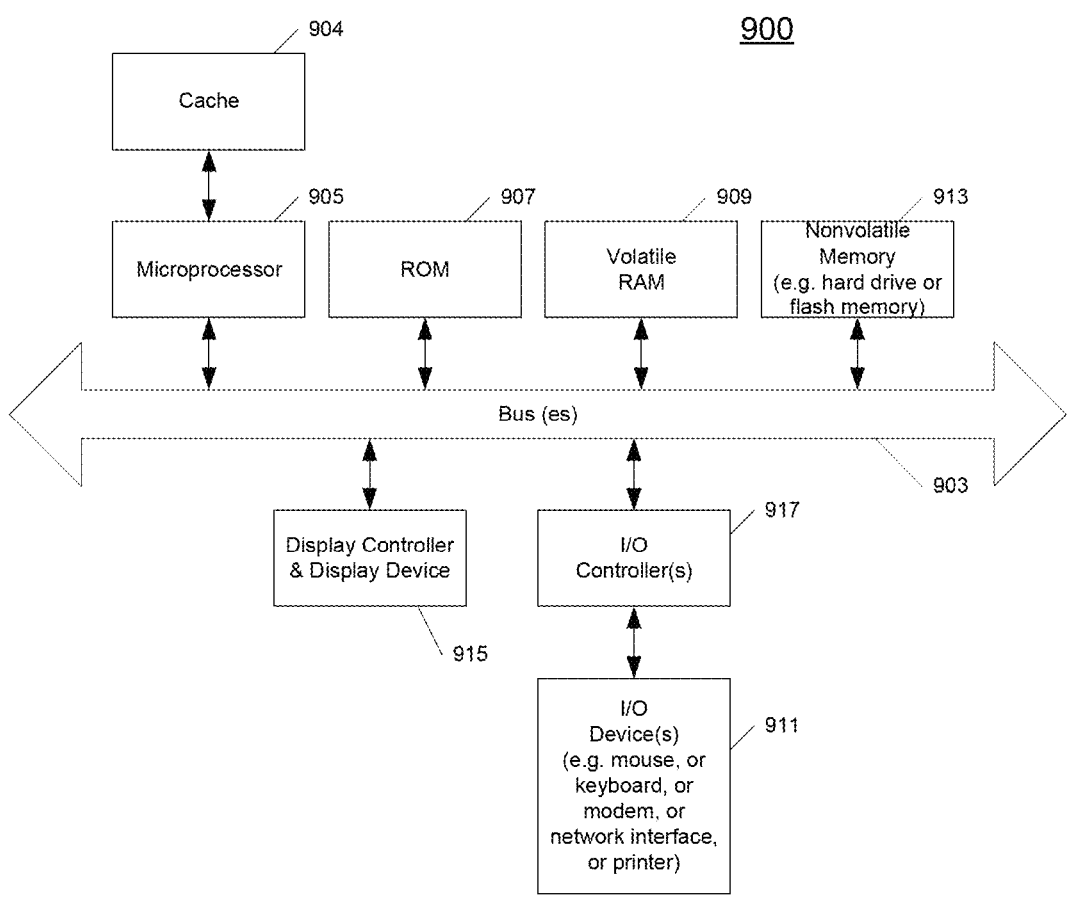
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented as a system that includes a PCI topology 100 as shown in FIG. 1 above. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may include one or more CPU(s), GPU(s), a specialized processor, and/or a combination thereof. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 919 and to peripheral devices such as input/output (I/O) devices which may be mice, keyboards, modems, network interfaces, printers and other devices which are well known in the art. Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD RAM or a flash memory or other types of memory systems, which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Figure 10:
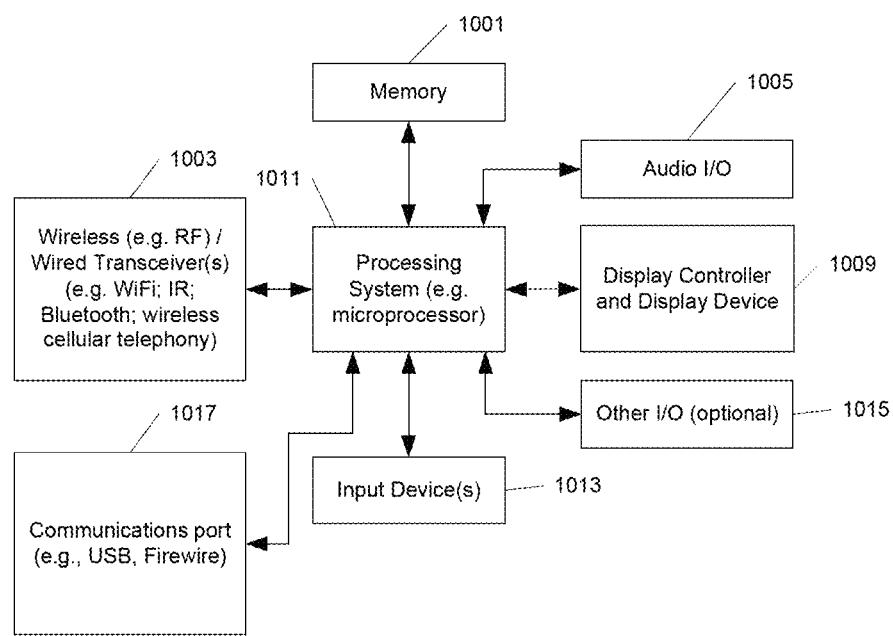
FIG. 10 shows an example of a data processing system, which may be used with one embodiment of the present invention.

FIG. 10 shows an example of another data processing system 1000 which may be used with one embodiment of the present invention. For example, system 1000 may be implemented as a build system 106 as shown in FIG. 1 above. The data processing system 1000 shown in FIG. 10 includes a processing system 1011, which may be one or more microprocessors, or which may be a system on a chip integrated circuit, and the system also includes memory 1001 for storing data and programs for execution by the processing system. The system 1000 also includes an audio input/output subsystem 1005, which may include a microphone and a speaker for, for example, playing back music or providing telephone functionality through the speaker and microphone.

A display controller and display device 1009 provide a visual user interface for the user; this digital interface may include a graphical user interface which is similar to that shown on a Macintosh computer when running OS X operating system software, or Apple iPhone when running the iOS operating system, etc. The system 1000 also includes one or more wireless transceivers 1003 to communicate with another data processing system, such as the system 1000 of FIG. 10. A wireless transceiver may be a WLAN transceiver, an infrared transceiver, a Bluetooth transceiver, and/or a wireless cellular telephony transceiver. It will be appreciated that additional components, not shown, may also be part of the system 1000 in certain embodiments, and in certain embodiments fewer components than shown in FIG. 10 may also be used in a data processing system. The system 1000 further includes one or more communications ports 1017 to communicate with another data processing system, such as the system 900 of FIG. 9. The communications port may be a USB port, Firewire port, Bluetooth interface, etc.

The data processing system 1000 also includes one or more input devices 1013, which are provided to allow a user to provide input to the system. These input devices may be a keypad or a keyboard or a touch panel or a multi touch panel. The data processing system 1000 also includes an optional input/output device 1015 which may be a connector for a dock. It will be appreciated that one or more buses, not shown, may be used to interconnect the various components as is well known in the art. The data processing system shown in FIG. 10 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1000 may be a network computer or an embedded processing device within another device, or other types of data processing systems, which have fewer components or perhaps more components than that shown in FIG. 10.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone (s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "determining," "sorting," "loading," "communicating," "assigning," "distributing," "allocating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to load balance a first plurality of Peripheral Connect Interconnect (PCI) ports in a device, the method comprising:
  detecting a second plurality of PCI ports in the device;
  determining a load for each port in the second plurality of PCI ports, wherein the load for each of the ports in the second plurality of PCI ports is determined using a metric representing the amount of bandwidth a given device coupled to this port could consume;
  sorting the second plurality of PCI ports;
  load balancing the first plurality of PCI ports using at least a PCIe switch and the load determination of the second plurality of PCI ports; and
  communicating data between the first and second plurality of PCI ports.

2. The machine-readable medium of claim 1, wherein the second plurality of PCI ports are downstream ports.

3. The machine-readable medium of claim 1, wherein the first plurality of PCI ports are upstream ports.

4. The machine-readable medium of claim 1, wherein the second plurality of PCI ports are relocatable.

5. The machine-readable medium of claim 1, wherein the sorting is based on at least of the load of a port of the second plurality of PCI ports.

6. The machine-readable medium of claim 1, wherein the load balancing comprises:
  assigning each of the ports in the second plurality of PCI ports to one of the plurality of first PCI ports such that the load is balanced is across the plurality of first PCI ports.

7. The machine-readable medium of claim 6, wherein the assignment is made using at least one of a bit vector of port assignments, a list or a table of ports.

8. The machine-readable medium of claim 1, wherein each of the first plurality of ports is coupled to a PCI Express Graphics port.

9. The machine-readable medium of claim 1, wherein the load of each of the second plurality of ports is determined by determining a figure of merit for PCI devices coupled to that port.

10. The machine-readable medium of claim 9, wherein the figure of merit for a port is based at least of a link width and a link speed.

11. A method to load balance a first plurality of Peripheral Connect Interconnect (PCI) ports in a device:
  detecting a second plurality of PCI ports in the device;
  determining a load for each port in the second plurality of PCI ports, wherein the load for each of the ports in the second plurality of PCI ports is determined using a metric representing the amount of bandwidth a given device coupled to this port could consume;
  sorting the second plurality of PCI ports;
  load balancing the first plurality of PCI ports using at least a PCIe switch and the load determination of the second plurality of PCI ports; and
  communicating data between the first and second plurality of PCI ports.

12. The method of claim 11, wherein the second plurality of PCI ports are downstream ports.

13. The method of claim 11, wherein the first plurality of PCI ports are upstream ports.

14. The method of claim 11, wherein the second plurality of PCI ports are relocatable.

15. The method of claim 11, wherein the sorting is based on at least of the load of a port of the second plurality of PCI ports.

16. The method of claim 11, wherein the load balancing comprises:
  assigning each of the ports in the second plurality of PCI ports to one of the plurality of first PCI ports such that the load is balanced is across the plurality of first PCI ports.

17. The method of claim 16, wherein the assignment is made using at least one of a bit vector of port assignments, a list or a table of ports.

18. The method of claim 11, wherein each of the first plurality of ports is coupled to a PCI Express Graphics port.

19. The method of claim 11, wherein the load of each of the second plurality of ports is determined by determining a figure of merit for PCI devices coupled to that port.

20. The method of claim 19, wherein the figure of merit for a port is based at least of a link width and a link speed.

* * * * *